United States Patent [19]
Keller

[11] Patent Number: 6,056,489
[45] Date of Patent: May 2, 2000

[54] EXPANSION DOWEL

[75] Inventor: Kai-Uwe Keller, Feldkirch-Tisis, Austria

[73] Assignee: Hilti Aktiengesellschaft, Schaan, Liechtenstein

[21] Appl. No.: 09/159,521

[22] Filed: Sep. 23, 1998

[30] Foreign Application Priority Data

Sep. 24, 1997 [DE] Germany .............. 197 42 022

[51] Int. Cl.$^7$ .................................................. F16B 13/04
[52] U.S. Cl. .................................... 411/21; 411/57.1
[58] Field of Search .......................... 411/21, 29, 42, 411/57.1, 60.1, 32, 33, 63–68, 348, 71, 49–53

[56] References Cited

U.S. PATENT DOCUMENTS

| | | | |
|---|---|---|---|
| 929,979 | 8/1909 | Pleister | 411/21 |
| 1,790,841 | 2/1931 | Rosen | 411/21 |
| 3,014,399 | 12/1961 | Schaffner . | |
| 3,279,301 | 10/1966 | Fischer | 411/57.1 |
| 4,290,338 | 9/1981 | Gruber | 411/21 |
| 4,673,320 | 6/1987 | Froehlich . | |

FOREIGN PATENT DOCUMENTS

| | | |
|---|---|---|
| 2454677 | 3/1976 | Germany . |
| 3309006 | 9/1984 | Germany . |

*Primary Examiner*—Flemming Saether
*Attorney, Agent, or Firm*—Brown & Wood, LLP

[57] ABSTRACT

An expansion dowel including a cylindrical, at least regionwise expandable dowel body (2) having a plurality of axial slots (22) opening at a front, in a setting direction(s), end (24) of the dowel body, and a bore (21) which tapers in the setting direction(s) in a region of the axial slots (22); an expansion sleeve (4) arranged inside of the dowel body (2) and tapering in the setting direction(s), the expansion sleeve (4) having a conically tapering, in the setting direction(s), bore (44), a plurality of slots extending in an axial direction, and a plurality of projections (47) projecting from an outer surface (42) of the sleeve and adapted to displace in the axial slots (22) of the dowel body (2); and an expansion member 93) axially displaceable in the bore (21) of the dowel body.

10 Claims, 2 Drawing Sheets

EXPANSION DOWEL

BACKGROUND OF THE INVENTION

1. Field of the Invention

The present invention relates to an expansion dowel that includes a cylindrical body having an expandable region, a plurality of axial slots extendable to a front, in the setting direction, end of the body, and a through—bore tapering in the setting direction in the region of the axial slots, with the dowel further including an expansion member located in the through-bore, axially displaceable relative to the cylindrical body, and fixable in the bore in its end position.

2. Description of the Prior Art

In the attachment technology, an expansion dowel, which includes a dowel body provided with a slot and having a conical bore tapering in a setting direction, and a conical expansion member axially displaceable in the bore of the dowel body, is often used. The displacement of the expansion member is effected by applying axial blows with a hammer or the like to the expansion member via a pin-shaped setting tool. During a preliminary driving-in of the expansion member, the dowel body is radially expanded and becomes thereby anchored in a bore of a structural component. With these impact-driven expansion dowels, which a usually formed of metal, attachments are effected quickly and in a simple manner. A drawback of the known expansion dowel consists in that it does not have a second expansion function in an expandable bore. Therefore, its range of applications, as a rule, is limited merely to the pressure zone of a structural component.

In order to achieve a certain secondary expansion characteristic with such an expansion dowel, solutions were proposed which contemplated fixing of the expansion member in the bore of a structural component during driving of the expansion member through the bore formed in the dowel body. Such a dowel is disclosed, e.g., in German patent publication DE-A-33 09 006. The disclosed expansion dowel has a cylindrical dowel body having axial slots formed at the front e nd of the body and opening in a setting direction and a through-bore. An expansion member is displaced axially in the through-bore upon radial expansion of the dowel body. On the circumference of the expansion member, there are provided radially projecting wedge cams which, on one hand, serve for radial expansion of the dowel body and, on another hand, should provide for fixing of the expansion member in the structural component to insure that the dowel body can further expand upon application of a load to the dowel body. The wedge cams are displaced into the expanded regions of the axial slots and project beyond the circumference of the dowel body. During driving of the dowel in and displacement of the expansion member, the wedge cams engage the wall of the bore formed in the structural component and form grooves in the bore wall which extend a longitudinal direction. The grooves extend from the bore mouth and have a depth corresponding to the radially projecting length of the wedge cams from the circumference of the dowel body. With an opening fissure, there is a danger of the expansion member drifting, during application of a load to the dowel, along the grooves toward the bore mouth and being pulled out of the bore.

Accordingly, an object of the present invention is to eliminate the drawbacks of the prior art expansion dowel. Another object of the present invention is to provide an expansion dowel which is suitable for use in a zone, which is subjected to tensile stresses, and which has adequate secondary expansion characteristics in order to prevent a sudden failure of an attachment point. At that, the expenses associated with anchoring of an inventive expansion dowel should remain the same as expenses associated with anchoring of a prior art dowel, and no additional operational steps should be necessary.

SUMMARY OF THE INVENTION

These and other objects of the present invention, which will become apparent hereinafter, are achieved by providing an expansion dowel including a cylindrical, at least region-wise expandable dowel body having a plurality of axial slots opening at a front, in a setting direction, end of the dowel body, and a bore which tapers in the setting direction in a region of the axial slots. An expansion sleeve is arranged inside of the dowel body and is axially displaceable relative thereto. The expansion sleeve tapers in the setting direction and has a conically tapering, also in the setting direction bore, a plurality of slots extending in an axial direction, and a plurality of projections projecting from an outer surface of the sleeve and adapted to displace in the axial slots of the dowel body. An expansion member is arranged in the bore of the dowel body and is axially displaceable relative to the dowel body. The expansion member has at least regionwise, a conical profile and is displaceable in the bore of the expansion sleeve upon a radial expansion of the expansion sleeve and a radial displacement of the projections.

The projections, which serve as clamping elements, are provided on a separate expansion sleeve located inside the dowel body. The projections extend radially outwardly upon the expansion sleeve being expanded radially. At the start of the setting process of the expansion dowel, the projections, which form the clamping elements and which project from the outer surface of the expansion sleeve, do not yet project beyond the circumference of the dowel body. Only after a preliminary driving-in of the expansion member into the conical bore of the expansion sleeve, the expansion sleeve expands to an extent that the projections, which extend into the axial slots of the dowel body, project beyond the dowel body circumference and engage the wall of the bore of the structural component. The penetration of the projections into the wall of the bore takes place only in a radial direction. Formation of longitudinal grooves during the driving-in cf the expansion member into its end position is reliably prevented. In its end position, the conical expansion member is secured in the conical bore of the expansion sleeve by friction, and it anchors the expansion sleeve by providing for form-locking engagement of the projections in the bore wall. The projections extend in the axial slots of the dowel body which open toward the front end of the dowel body. Thereby, the dowel body is displaceable relative to the expansion sleeve upon loading of the dowel body. In this way, the dowel body, which is displaced over the sleeve, increases the clamping force acting on the expansion member. As a result of the expansion sleeve and/or of the expansion member being fixed in the structural component bore, and of the relative displacement capability of the dowel body, the expansion dowel according to the present invention can additionally expand in an operable fissure. The anchoring of the inventive expansion dowel is effected in a conventional way. The expansion dowel is placed into a prepared bore and then the expansion member is driven into its end position.

Because the projections are uniformly distributed over the circumference of the expansion sleeve, the expansion sleeve is subjected to a uniform loading during its radial expansion and can prevent tilting of the expansion dowel in a bore with large diameter tolerances. The radial length of the projections is selected in such a way that they in their radially expanded condition, project beyond the largest diameter of the dowel body by from about 0.15 mm to about 0.6 mm. At that, the expansion sleeve has an outer diameter that insurers its displacement relative to the dowel body.

For anchoring of the expansion sleeve and of the expansion member, which is held in its end position in the conical bore of the expansion sleeve by friction, it proved to be advantageous when the projections are strip-shaped. At that, their length should be equal to or be maximum by 5 mm smaller than the length of the axial slots. Thereby, the surface of the axial slot of the expansion dowel is filled in to the best possible extent.

When the strip-shaped projections have a width, which is equal to or is smaller than the width of the axial slots formed in the dowel body, the expansion sleeve is held in the dowel body in a predetermined position. The width of a slot is so selected that the sum of widths of all axial slots amounts to from about one/fourth to about three/sevenths of the dowel body circumference. Thereby, a sufficient part of the outer surface of the dowel body remains for frictional anchoring of the dowel body in the bore of a structural component.

Because of a symmetrical loading of the expansion sleeve during anchoring, it is preferable to provide an even number of the strip-shaped projections, with each two projections being located opposite each other.

Advantageously, the expansion sleeve, which is displaceable inside the dowel body, has a wall thickness amounting to from about 0.3 mm to about 1.5 mm. This wall thickness insures a reliable expansion of the slotted expansion sleeve. Simultaneously, during anchoring, a transmission of a sufficiently large displacement force is insured, without the expansion member being blocked by flow of the material.

The inner wall and the outer surface of the conical expansion sleeve extend toward the axis at an angle of from about 2° to about 8°, preferably 3.5° at this inclination angle, a reliable radial expansion of the sleeve is insured and simultaneously, the forces necessary for driving-in cf the expansion member remain relatively small and can be reliably obtained with hammer blows.

An inclination angle of the inner wall of the dowel body, which limits the conical through-bore of the dowel body, in the region of the axial slots, is equal to or is larger than the inclination angle of the outer surface of the expansion sleeve. This insures a reliable secondary expansion of the dowel body under a load applied thereto.

The length of the expansion member amounts to about two/third of the entire length of the axial slot of the dowel body. Thereby, the expansion sleeve is subjected to the expansion forces along as large as possible region of its longitudinal extent. In its initial position, the expansion member projects into the conical bore of the expansion sleeve by from about 2 to about 5 mm. Thereby, the expansion member, already at the beginning of the expansion process, with a first blow, is driven into the bore of the expansion sleeve.

BRIEF DESCRIPTION OF THE DRAWINGS

The features and objects of the present invention will become more apparent, and the invention itself will be best understood from the following detailed description for the preferred embodiments when read with reference to the accompanying drawings, where in.

DETAILED DESCRIPTION OF THE PREFERRED EMBODIMENT

Figure 1:
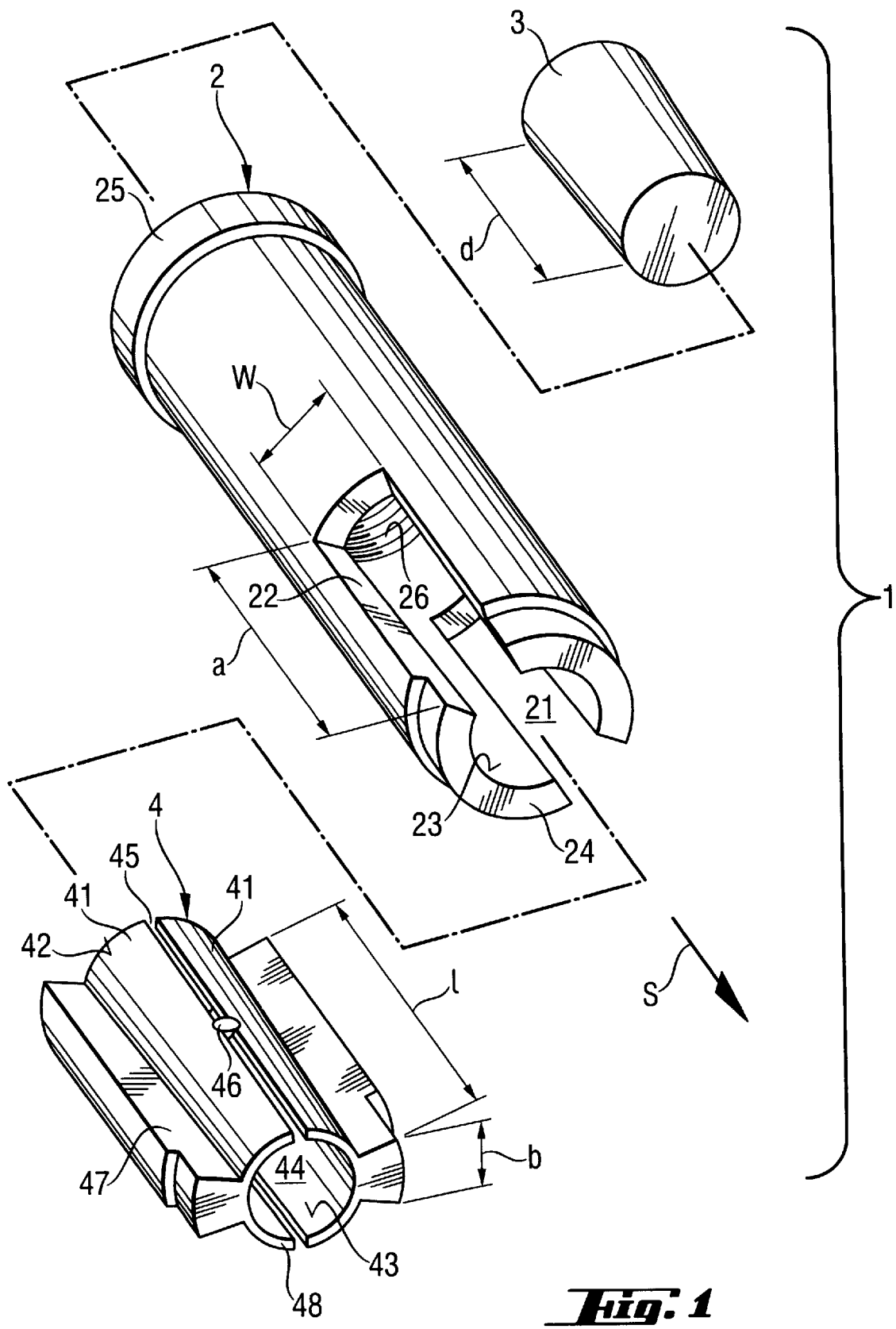
FIG. 1 shows an exploded view of an expansion dowel according to the present invention.
Figure 2:
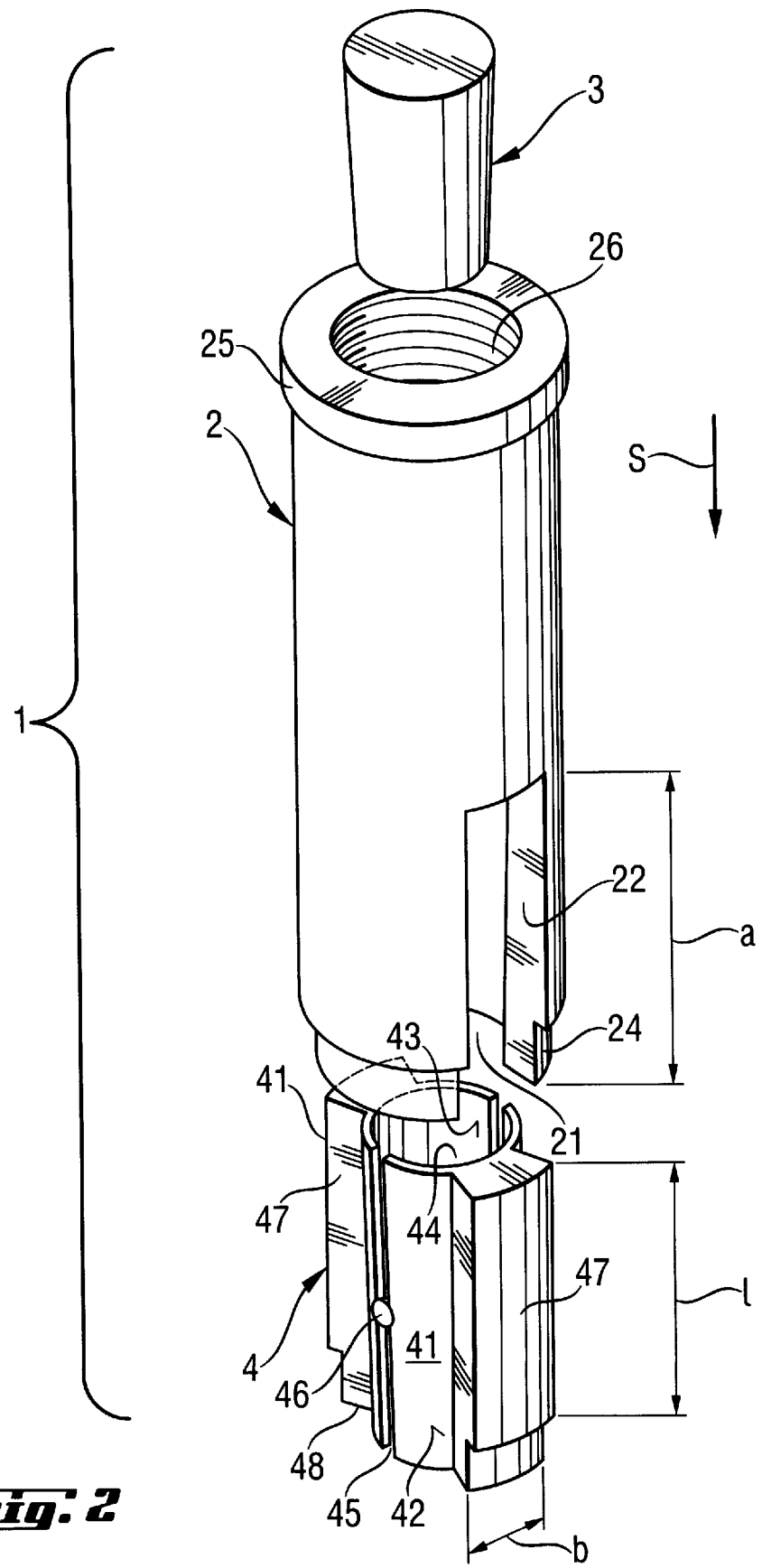
FIG. 2 shows an exploded view of the expansion dowel shown in FIG. 1, with the expansion dowel components in a pullout position.

In FIGS. 1 and 2, an expansion dowel according to the present invention is generally designated with a reference numeral 1. The expansion dowel 1 is formed of a dowel body 2, an expansion member 3, and an expansion sleeve 4. The dowel body 2 has a cylindrical shape and is provided with an axial bore 21 and axial slot 22 which are open at the front end 24 of the dowel body 2 facing in a setting direction S. The axial slots 22 can extend only along a portion of the axial length 22 as shown in the embodiment of the dowel 1 shown in the Figures. The axial slots 22 can also extend along the entire length of the dowel body 2. The axial slots 22 impart to the dowel body 2 the flexibility which is necessary for the expansion to take place. In the region of the axial slot 22, the bore 21 has an inner diameter which tapers toward the front end 24 of the dowel body 2. At the rear section of the dowel body 2, there is provided load application means. In the embodiment of the dowel shown in the drawings, the load application means is formed as an inner thread 26. The dowel body 2 can have, at its rear end, an annular band 25 which insures support of the dowel body 2 against a mouth of a bore.

The dowel body 2 expands, in the same way as a conventional expansion dowel, upon a relative movement of the expansion member 3 with respect to the dowel body 2. However, in contrast to a conventional expansion dowel, the expansion member 3 is not directly displaced in the bore 21 of the dowel body 2. According to the invention, an expansion sleeve 4 with an axial bore 44 is arranged in the bore 21 of the dowel body 2.

The expansion member 3 is displaced in the axial bore 44 of the expansion sleeve 4. The expansion sleeve 4 has a plurality of longitudinal slots 45 which, as shown in the drawings, can extend over the entire length of the expansion sleeve 4. The sleeve segments 41, which are formed by the longitudinal slots 45, can be connected with breakable weld points 46 or the like. The expansion sleeve 4 has a conical outer contour which tapers toward the front end 48 of the expansion sleeve 4 in the setting direction S. The axial bore 44 of the expansion sleeve 4 has likewise a conical shape and has a taper corresponding to the outer contour of the expansion sleeve 4. The inner wall 43 and the outer surface 42 of the expansion sleeve 4 are inclined towards the axis at angle from about 2° to about 8°, preferably at 3.5°. The expansion sleeve 4 has a minimal wall thickness which varies from about 0.3 mm to about 1.5 mm.

A strip-like projection 47 are provided on the expansion sleeve 4. The projections 47 project radially from the outer surface 42 and extend parallel to the axis of the expansion sleeve 4. The strip-like projections 47 have a length C which is equal to or maximum 5 mm smaller than the axial length a of the axial slots 22 of the dowel body 2. The width w of the slot 22 is so selected that the sum of widths of all axial slots 22 amounts to from about ¼ to about 3/7 of the circumference of the dowel body 2. The selected length I and the width b of the strip-like projections 47 of the expansion sleeve 4, together with the outer surface of the expansion sleeve 4, insure movement of the expansion sleeve 4 relative to the dowel body 2. The strip-like projection 47 of the expansion sleeve 4 extend into the axial slots 22 of the dowel body 2. The radial projecting length of the projections 47 with respect to the outer surface 42 of the expansion sleeve 4 is so selected that the strip-like projection 47 projects beyond the largest diameter of the dowel body 2, in radially expanded condition of the expansion sleeve 4, by from about 0.15 mm to about 0.6 mm respectively.

In FIG. 2, the position of the dowel components before assembly of the dowel is shown. During preassembly, the expansion sleeve 4 is pushed into the bore 21 of the dowel body 2 from the front end 24. The cone-shaped expansion member 3 is pushed into the bore 21 from the rear end of the dowel body 2 and then is pushed into the bore 44 of the expansion sleeve 4. The expansion member 3 has an axial length from about two thirds of the length a of the axial slot 22 of the dowel body 2 to the entire length a. In the preassembled condition of the expansion dowel 1, the expansion member 3 projects into the bore 44 of the expansion sleeve 4 from about 2 mm to about 5 mm. As a result, the expansion sleeve 4 expands radially to an extent which insures retaining the expansion sleeve 4 in the bore 21 of the dowel body 2 without a danger of the expansion sleeve 4 being lost. In this position of the expansion sleeve 4, the strip-like projections 47, which are received in the axial slots 22, do not yet project beyond the circumference of the dowel body 2.

For anchoring the inventive expansion dowel 1, it is pushed in its preassembled condition into an already prepared bore. Thereafter, the conical expansion member 3 is driven in the conical axial bore 44 of the expansion sleeve 4 with a conventional pin-shaped setting tool to which axial blows are applied, e.g., with a hammer. At that, the weld points 46 on the longitudinal slots 45 of the expansion sleeve 4 are broken, and the expansion sleeve 4 expands radially. Upon expansion of the sleeve 4 radially, the strip-like projections 47 are pressed into the wall of the bore of the structural component. As a result of the strip-like projections 47 being pressed into the bore wall, the expansion member 3 which, in its end position, is frictionally engaged in the bore 44 of the expansion sleeve 4, is form-lockingly fixed in the bore of the structural component by the expansion sleeve 4. Upon the expansion of the sleeve 4, the dowel body 2 is likewise expanded in the corresponding region. The axial slots 22, which are open at the front end 24 of the dowel body 2, provide for an axial displacement of the dowel body 2 relative to the expansion sleeve 4 upon application of a load to the dowel body 2. The inner wall 23 of the dowel body 23 tapers toward the front end 24 to the same extent of the outer surface 42 of the expansion sleeve 4. However, the conicity of the inner surface 23 of the dowel body 2 can exceed that of the outer surface 42 of the expansion sleeve 4. Upon application of a load and, particularly, during an axial relative displacement in an opening crevice, the inner wall 23 of the dowel body 2 is displaced over the conical outer surface 42 of the expansion sleeve 4, causing expansion of the dowel body 2.

Though the present invention was shown and described with references to the preferred embodiments, various modifications thereof will be apparent to those skilled in the art, and therefore, it is not intended that the invention be limited to the disclosed embodiment or details thereof, and departure can be made therefrom within the spirit and scope of the appended claims.

What is claimed is:

1. An expansion dowel, comprising a cylindrical dowel body (2) having an expandable region, a plurality of axial slots (22) extending to a front, in a setting direction (S), end (24) of the body, and a through-bore (21) which tapers in the setting direction (S) in a region of the axial slots (22); an expansion sleeve (4) located inside of the dowel body (2) and tapering in the setting direction (S), the expansion sleeve (4) having a conical, tapering, in the setting direction (S), bore (44), a plurality of axially extending slots, and a plurality of projections (47) projecting from an outer surface (42) of the sleeve (4) and adapted to displace in the axial slots (22) of the dowel body (2); and an expansion member (3) having, at least partially, a conical profile and arranged in the bore (44) of the expansion sleeve (4), the expantion member (3) displacing axially relative to the dowel body (2) in the bore (44) of the expansion sleeve (4) upon a radial expansion of the expansion sleeve (4) and a radial displacement of the projections (47), and being fixed in an end position thereof by the radially extending projections (47) projecting through the axial slots (22) of the dowel body (21).

2. An expansion dowel according to claim 1, wherein the projections (47) are uniformly distributed over a circumference of the expansion sleeve (4) and project radially beyond a largest diameter of the dowel body (2) from about 0.15 mm to about 0.6 mm in a radially expanded position of the expansion sleeve.

3. An expansion dowel according to claim 1, wherein the projections (47) are formed as strip-shaped projections and have an axial length (l) which is smaller than or is equal to a length (a) of the axial slots (22) of the dowel body.

4. An expansion dowel according to claim 3, wherein the strip-shaped projections (47) have a width (b) smaller than or substantially equal to the width (w) of the axial slots (22) of the dowel body (2), and wherein a sum of widths (w) of all axial slots (22) of the dowel body (2) amounts, to from about ¼ to about ⅜ of a circumference of the dowel body (2).

5. An expansion dowel according to claim 3, wherein at least two projections (47) are provided.

6. An expansion dowel according to claim 1, wherein the expansion sleeve (4) has a wall thickness amounting to from about 0.3 mm to about 1.5 mm.

7. An expansion dowel according to claim 1, wherein an inner wall (43) and the outer surface (42) of the expansion sleeve (4) are inclined toward an axis of the expansion sleeve (4) at an angle from about 2° to about 8°.

8. An expansion dowel according to claim 1, wherein an inner wall (43) and the outer surface (42) of the expansion sleeve (4) are inclined toward an axis of the expansion sleeve (4) at an angle of 3.5°.

9. An expansion dowel according to claim 1, wherein an inclination angle of an inner wall (23) of the dowel body (2), in a region of the axial slots (22), is greater than or equal to an inclination angle of the outer surface (42) of the expansion sleeve (4).

10. An expansion dowel according to claim 1, wherein the expansion member (3) has a length (d) which amounts to from about two third of a length (a) of the axial slots (22) of the dowel body (2) to about an entire length (a) of the axial slots (22), and wherein the expansion member (3) projects, in an initial position thereof, into the conical bore (44) of the expansion sleeve (4), by from about 2 mm to about 5 mm.

* * * * *